United States Patent Office 3,421,974
Patented Jan. 14, 1969

3,421,974
COPOLYESTERS OF MIXED PHTHALIC ACIDS, ACYCLIC DICARBOXYLIC ACIDS AND TETRAMETHYLENE GLYCOL
Maria V. Wiener, Akron, Ohio, assignor to The Goodyear Tire & Rubber Company, Akron, Ohio, a corporation of Ohio
No Drawing. Filed Sept. 18, 1964, Ser. No. 397,648
U.S. Cl. 161—226     5 Claims
Int. Cl. B32b 27/08; C08g 17/08

This invention relates to new copolyester resins. The invention further relates to new resins, products prepared therefrom and to the use of such resins as adhesives.

In the cement process for manufacturing shoes the shoe is lasted and assembled using an adhesive to adhere the various parts of the shoe together. The adhesive used in the toe portion of the shoe for holding the upper and for adhering the sole to the toe can be fast setting, and when set may be stiff and inflexible. In contrast, the adhesive used for cementing the portion of the shoe between the shank and the toe which is the ball portion of the shoe is preferably slower setting to allow positioning of the sole and must be flexible when set to allow the ball of the shoe to freely flex and bend with the movement of the foot of the wearer. The present invention is directed to new copolyester resins which can be used to adhere the entire shoe sole or any portion of it to the upper and give good service in a shoe.

It is an object of the present invention to provide new thermoplastic copolyester resins which are highly effective as adhesives for preparing laminates and are particularly useful in cementing a shoe sole to a shoe upper. It is another object to provide an adhesive which can be applied as a hot melt or from solution. Still another object is to provide an adhesive layer which has high impact resistance and a good flex life and remains flexible on aging. Other objects will appear as a description of the invention proceeds.

The present invention provides thermoplastic copolyester resins derived from tetramethylene glycol, terephthalic acid, isophthalic acid, and an acyclic dicarboxylic acid in certain critical proportions. The copolyester resins contain from 70 to 85 mol percent of a mixture of terephthalic acid units and isophthalic acid units, the ratio of the terephthalic acid units to isophthalic acid units being from about 3:2 to 2:3, and from 30 to 15 mol percent of an acyclic dicarboxylic acid, said acyclic dicarboxylic acid containing from 6 to 12 carbon atoms in a linear chain. It has been found that tetramethylene dicarboxylate copolyester resins containing terephthalate units and isophthalate units in the above ratios, but less than 15 mol percent of the units of said acyclic dicarboxylic acid tend to become brittle on aging and are not sufficiently flexible for applications in which the bonded layers are exposed to bending and flexing. A proportion of more than 30 mol percent of units of said acyclic dicarboxylic acid in the copolyesters results in products that are soft and have low bonding strength. If the terephthalic acid comprises more than 60 percent of the sum of the terephthalic acid units and isophthalic acid units the copolyesters crystallize too rapidly and to such an extent that the products are not very flexible and lose some of their adhesive properties on aging. They also are not sufficiently soluble in common solvents and it is therefore not practical to apply them from solutions. On the other hand, if the terephthalic acid content is less than about 40 percent of the aromatic dicarboxylic acid mixture the adhesive sets too slowly and thus cannot be efficiently applied in a mass production process. Thus the resins of the application comprise units of tetramethylene glycol, with a mixture of terephthalic acid, isophthalic acid and an acyclic dicarboxylic acid in a certain narrow range of proportions. The sum of the acid units present in the copolyester resins equals 100 mol percent.

The invention is illustrated by the following examples.

Example 1

A glass reaction vessel in the shape of a tube approximately 35 centimeters long having an inside diameter of 38 millimeters equipped with a side arm, a nitrogen gas inlet tube and a stirrer was charged with 15.5 grams of dimethyl terephthalate, 15.5 grams of dimethyl isophthalate, 41.4 grams of tetramethylene glycol and 0.125 gram of lead acetate trihydrate. The mixture was stirred and heated by means of a vapor bath having a temperature of about 245° C. for one and one-half hours. Methanol that distilled out of the mixture was collected in a receiver. Then 8.1 grams of sebacic acid were added to the reaction vessel, the pressure in the system was reduced to 120 millimeters of mercury pressure and the mixture was reacted at this pressure at 245° C. bath temperature for one hour. Then the pressure in the system was reduced below one millimeter of mercury pressure and the mixture was heated by means of a vapor bath having a boiling point of 265° C. The mixture was reacted under those conditions for two hours. Water formed in the reaction and also tetramethylene glycol and some tetrahydrofuran (side reaction product) were distilled out of the mixture. The product obtained had an intrinsic viscosity of 0.735 and a crystalline melting temperature of 110° C. The polymer had excellent adhesion characteristics and readily adhered to leather, paper, textiles, wood, plastics, rubbers and to pre-heated metal and glass.

Example 2

Example 1 was repeated with the exception that 7.6 grams of Emerox 1133, which is a technical grade of azelaic acid, were used in place of the sebacic acid used in Example 1. The resulting copolymer had an intrinsic viscosity of 0.715 and a crystalline melting point of 108° C. This copolymer readily adhered to leather, paper, textiles, wood, plastics, rubbers, metal and glass.

The invention has been illustrated with respect to the preparation of certain of the copolyester resins. Other copolyester resins within the scope of the invention can similarly be prepared, the ratios of the reactants being adjusted to regulate the composition of the resin. The acyclic dicarboxylic acid used to prepare the copolyester resins contains from 6 to 12 carbon atoms in the linear chain. The chain may contain lower alkyl substituents. Representative examples of the aliphatic dicarboxylic acids that can be used are adipic acid, pimelic acid, suberic acid, azelaic acid, sebacic acid, dodecanedioic acid, and 2,5 dimethyl adipic acid. The copolyester resins were prepared by esterification reactions as well as by the ester interchange method and by a combination of the ester interchange and esterification method illustrated. When the esterification method is used all of the acids are placed in the reactor, reacted with the glycol and then condensed to high molecular weight. When the ester interchange method is combined with esterification esters of one or more of the acids are reacted with the glycol under alcoholysis conditions to prepare the glycol ester of the acids and the product is reacted with the free acid to esterify it. The mixture is condensed to form high molecular weight polymer. Also, if desired, one can start with bis delta hydroxy butyl terephthalate and react it with isophthalic acid and the acyclic acid in the presence of additional glycol if needed to completely esterify the acids and the product can then be condensed to form high molecular weight polymer. In preparing the copolyester resins suitable catalysts such as soluble lead or titanium containing materials are used. Catalysts such as lead acetate and litharge can be used as well as a soluble titanium containing material such as the glycol titanates. Since tetramethylene glycol cyclizes to form large amounts of tetrahydrofuran at elevated temperatures in the presence of strong acids and in the presence of strong dehydration catalysts such materials are preferably not used when these polyester resins are prepared.

The ester exchange and esterification reactions are in general carried out in accordance with the usual known techniques. Thus the reactions are preferably carried out in an atmosphere of inert gas such as nitrogen or the like in order to lessen darkening. The condensation polymerization reaction of polytetramethylene dicarboxylates is carried out under reduced pressure, generally below 10 millimeters of mercury pressure and usually at or below one millimeter of mercury pressure at a temperature in the range of from about 250 to 270° C. until the polymer formed has an intrinsic viscosity of at least 0.3, generally 0.4 or higher, measured in a 60/40 phenol-tetrachloroethane mixed solvent at 30.0° C.

The preparation of the copolyester resins starting with the dimethyl esters of terephthalic acid and isophthalic acid was illustrated in the examples above. Other esters such as the ethyl, propyl, butyl and phenyl esters can be used if desired.

The copolyester resins of the present invention have properties which make them highly desirable for use as adhesives, particularly where laminates subjected to flexing or bending are prepared. The copolyester resins have relatively high elongation and low glass transition temperatures. They are soluble in some of the common organic solvents such as methylene chloride, ethylene dichloride and similar solvents. The copolyester resins crystallize relatively slowly and since their crystallization does not proceed to a very high extent they remain flexible and have high impact resistance, even after prolonged aging. Due to these qualities the copolyesters of the invention can be used in various applications. They may be especially useful in films, sheets, coatings and molded objects. More specifically, the resins can be used in the manufacture of rainwear, as backing for carpets to secure threads in permanent position and to protect them from abrasion and pulling, as protective coatings for various substrates such as paper, wood, fabrics, metal and glass, as adhesives for melt and solution applications, and for the manufacture of a variety of shaped objects.

The copolyester resins are generally used without further compounding, but they can be compounded or physically blended with other materials if desired. Thus, resins, elastomers, pigments, dyes, plasticizers and other ingredients can be mixed or blended with the copolyesters and used in various applications.

While certain representative embodiments and details have been shown for the purpose of illustrating the invention it will be apparent to those skilled in the art that various changes and modifications may be made therein without departing from the spirit or scope of the invention.

What I claim is:

1. A random linear copolyester resin consisting of units of tetramethylene glycol, terephthalic acid, isophthalic acid and an acyclic dicarboxylic acid containing from 6 to 12 carbon atoms, in which the terephthalic acid units and the isophthalic acid units are present in the ratio of 3:2 to 2:3, the sum of the terephthalic acid units plus the isophthalic acid units comprising from 70 to 85 mol percent of the total mols of acid component of the resin, the acyclic dicarboxylic acid units correspondingly comprising from 30 to 15 mol percent of the total mols of acid component of the resin.

2. The copolyester of claim 1 in which the aliphatic dicarboxylic acid unit is sebacic acid unit.

3. The copolyester of claim 1 in which the aliphatic dicarboxylic acid unit in the copolyester is azelaic acid unit.

4. A laminate comprising a layer of leather adhered to a second layer by means of an intermediate layer comprising a coplyester of claim 1.

5. The copolyester of claim 1 in the form of a film.

References Cited

UNITED STATES PATENTS 3,013,914   12/1961   Willard _____ 260—75

FOREIGN PATENTS 766,290   1/1957   Great Britain.
588,833   6/1947   Great Britain.

WILLIAM H. SHORT, *Primary Examiner.*

M. GOLDSTEIN, *Assistant Examiner.*

U.S. Cl. X.R.

260—75, 33.8; 117—124, 127, 148, 155; 161—231